March 26, 1940.  G. C. MONCKMEIER  2,195,280
VARIABLE DRIVE SPROCKET WHEEL FOR BICYCLES
Filed May 6, 1937
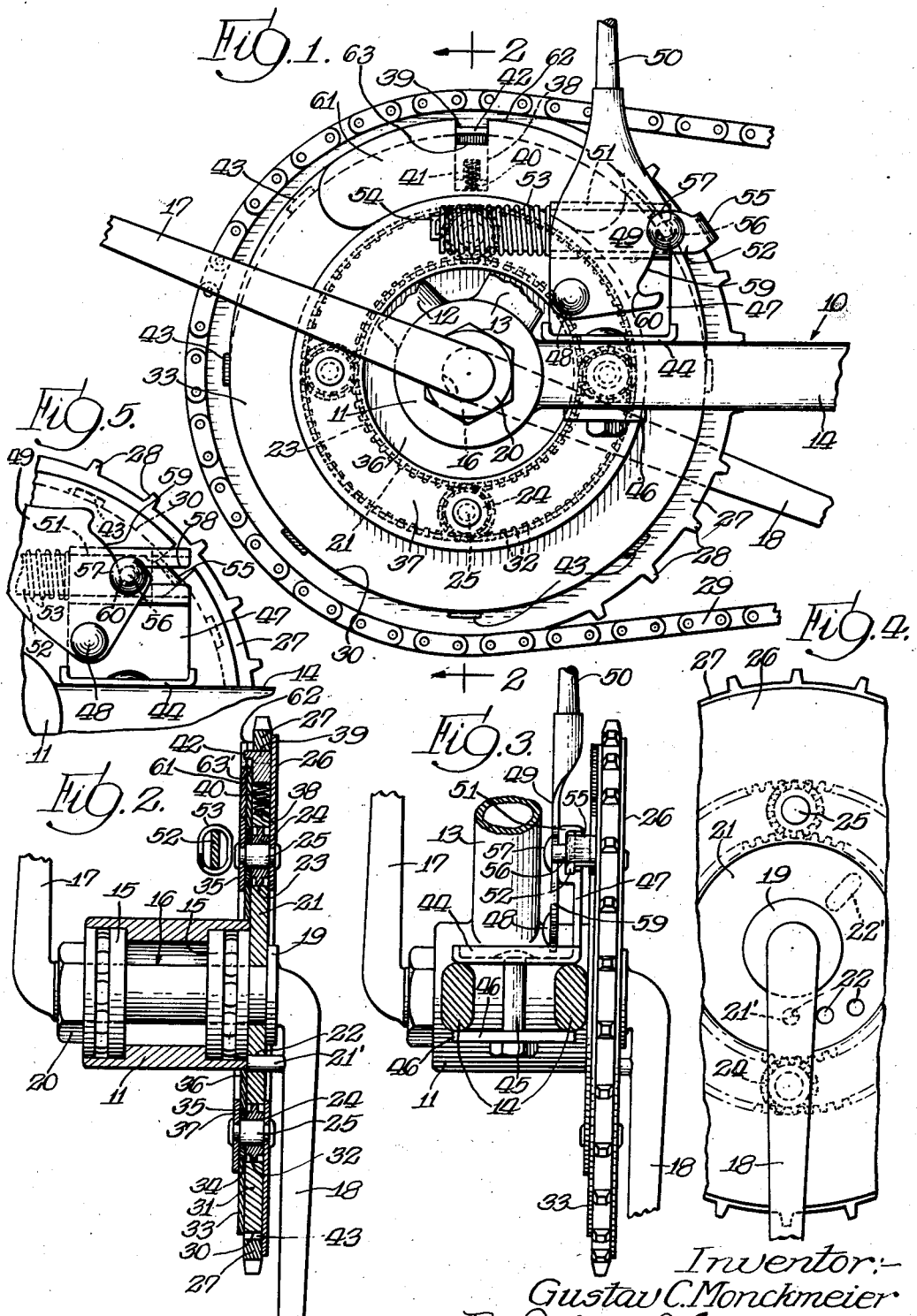
Inventor:—
Gustav C. Monckmeier
By John P. Smith Atty.

Patented Mar. 26, 1940

2,195,280

UNITED STATES PATENT OFFICE 2,195,280

VARIABLE DRIVE SPROCKET WHEEL FOR BICYCLES

Gustav C. Monckmeier, Davenport, Iowa

Application May 6, 1937, Serial No. 141,011

3 Claims. (Cl. 74—291)

The present invention relates generally to a variable speed drive sprocket wheel for bicycles, but more particularly to a two speed drive wholly mounted within the sprocket wheel which is adapted to be substituted in lieu of the conventional drive sprocket wheel of the bicycle.

One of the objects of the present invention is to provide a novel and improved variable speed drive sprocket wheel for a bicycle which is compact in form and occupies no more space than and adapted to be substituted for the conventional drive sprocket wheel of a bicycle.

A further object of the invention is to provide a simple, compact and efficiently operated variable speed drive sprocket wheel in which by the manipulation of a lever, the drive sprocket wheel is operatively connected in high or low speed so that there is no neutral or non-driving relation between the drive sprocket wheel and the bicycle adding an important safety factor.

A still further object of the invention is to provide a novel and improved variable speed sprocket wheel for a bicycle drive in which the gears and pinions thereof are held in properly spaced meshing relation with respect to each other so as to prevent binding of the operating parts thereof.

Another object of the invention is to provide a novel and improved variable speed drive sprocket wheel for bicycle having a novel control or lever shifting mechanism associated therewith which includes a latch member adapted to perform the function of unlocking certain of the driving members from one another and at the same time preventing the rotation of one of the drive members.

These and other objects are accomplished by providing a construction and an arrangement of the various parts in the manner hereinafter described and particularly pointed out in the appended claims.

Referring to the drawing:

Fig. 1 is a side elevational view of a fragmentary portion of a conventional bicycle showing my improved variable drive speed sprocket wheel mounted thereon;

Fig. 2 is a cross sectional view taken on the line 2—2 in Fig. 1;

Fig. 3 is a rear elevational view partly in cross section of the construction shown in Figs. 1 and 2;

Fig. 4 is a fragmentary detailed view of the variable speed drive sprocket wheel; and Fig. 5 is a fragmentary view showing the manner in which the lever is shifted for locking one of the speed drive members against rotation so as to attain the low speed drive.

In illustrating one form of my invention I have shown the same in connection with a conventional form of bicycle frame, only a fragmentary portion of which is shown in the drawing and generally indicated by the reference character 10. The frame structure includes a bearing housing 11, forwardly and rearwardly diverging tubular bars 12 and 13 which are formed integrally with or welded to the bearing housing 11. Extending rearwardly from the housing 11 and formed integrally therewith or welded thereto are the usual horizontal spaced apart frame bars 14. Journaled on suitable ball bearings 15 located within the housing 11 is a conventional pedal crank generally indicated by the reference character 16. Formed integrally with the crank shaft 16 are the usual oppositely arranged crank or pedal arms 17 and 18. The crank shaft and pedals are retained in their bearings within the housing 11 by a flange 19 adjacent one of the pedal arms 18 and engageable with the sprocket wheel on one side and a securing nut 20 mounted in threaded engagement on the other side thereof adjacent the other pedal arm 17. One of the pedal arms 18 is provided with an inwardly projecting cylindrical driving pin or lug 21' which normally engages an aperture in the conventional sprocket wheel for operatively driving the same. The construction thus far described is essentially the conventional consruction of a conventional bicycle now in use and it is the primary feature of the present invention to provide a variable speed sprocket wheel without mutilating, modifying or disfiguring the conventional bicycle structure, but by merely substituting the new variable drive sprocket wheel for the conventional one.

My improved variable speed drive sprocket wheel comprises a main driving gear in the form of a disc which is provided with a plurality of apertures as shown at 22 located at different radii with respect to the axis of the gear for engaging the pin 21' on one of the drive pedals 18. These apertures are located at different radii from the center of the gear so as to accommodate various types of bicycles which have the pin located at different radii from the axis of the crank shaft. In lieu of these different spaced apart apertures 22 a slot as shown at 22' may be substituted so that the sprocket wheel will fit any type of conventional bicycle. Located on the periphery of the wheel 21 are gear teeth 23. Mounted in meshing relation with the gear teeth 23 of the gear wheel 21 are four equally spaced apart pinions 24 which are journaled on shafts or pins 25. These pinions and shafts are carried by and secured to one side of a washer-like plate 26. Secured to one side of the plate 26 adjacent the periphery is a sprocket wheel ring 27 which in turn is provided with the conventional sprocket chain teeth 28 about which a conventional drive chain 29 is adapted to be trained and driven thereby. Journaled within the cylindrical surface 30 of the sprocket wheel ring 27 is an internal gear ring 31 which in turn is provided with internal gear teeth 32 which in turn are adapted to mesh with the four equally spaced apart pinions 24 in the manner clearly indicated in Figs. 1 and 2 of the drawing. Secured to one side of the internal gear ring 31 is a circularly spacer plate 33, the inner cylindrical edge of which as shown at 34 contacts and forms the bearing surface for washers 35 journaled on each of the pinion shafts 25. The inner portions of each of these washers bear against a second spacer plate 36 secured to one side of the gear 21 as disclosed clearly in Fig. 2 of the drawing. These spacer plates and washers 35 hold each of the pinions in proper meshing relation and proper clearance with respect to the gear and internal gear ring. Secured to the same side of the spacer plate 33 and 36 and overlapping each of these plates so as to enclose the pinions is a ring plate or enlarged washer 37 which in turn is secured to and supports the pinions 24 by the pinion shafts or rivets 25. Located on one side of the internal gear ring 31 is a radially disposed recess 38 of rectangular cross section, in which is mounted a reciprocable pawl or locking member 39. The pawl 39 is normally pressed outwardly by a spring 40 which in turn is mounted in the bottom of the socket or recess 38 and has the outer end thereof extending between two spaced apart legs 41 of the pawl 39. The locking member 39 is provided with a laterally projecting lug as shown at 42 which is adapted to be in position to be engaged by a trip lock hereinafter described. Located at regular spaced part intervals on the internal surface of the sprocket wheel ring 27 are pawl engaging recesses 43 in which the pawl 39 is adapted to lock the internal gear ring against the sprocket wheel ring 27 so that both may be driven as one.

The lever mechanism which controls variable speed drive sprocket wheel is mounted in a bracket which is adapted to be attached to the conventional bicycle frame so that the lever thereof extends upwardly to within easy reach of the operator on the seat of the bicycle. This mechanism comprises a bracket 44 which is adapted to be clamped to the conventional horizontal frame bars 14 by a securing bolt 45 and a transverse strap 46 in the manner clearly illustrated in Figs. 1, 3 and 5 of the drawing. Pivotally secured to the vertically extending portion 47 of the bracket 44 by means of a pin or rivet 48 is a camming portion 49 of an upwardly extending manually operable lever 50. The lever 50 extends upwardly within easy reach of the operator's seat of the bicycle. Formed integrally with and adjacent the top of the upwardly projecting portion 47 of the bracket 44 is a rectangularly formed and horizontally extending sleeve 51 in which is reciprocally mounted a longitudinally mounted trip 52. The trip 52 is normally pressed forwardly by a spring 53 which has one end thereof engaging the sleeve 51 of the bracket 44 and the other end thereof secured to the trip by cotter pin 54 as clearly shown in Fig. 1 of the drawing. Formed on the rear end of the trip 52 is an angularly and laterally projecting lug or flange 55 which is adapted to be moved into and out of the path of the pawl 39 by the manipulation of the lever 50 in the manner hereinafter described. Secured to one side of the locking member 52 is a laterally projecting pin 56 which has an enlarged head 57. The pin 56 is adapted to reciprocate with the latch member 52 in a slot 58 in one side of the rectangular sleeve 51 of the bracket 44. Another portion of the pin 56 is adapted to engage the camming surface 59 of the member 49 of the lever in actuating the locking member 52 so that the flange portion 55 thereof will depress the pawl 39 disengaging it from one of the locking recesses 43 and simultaneously lock the gear ring 31 from rotation in the manner clearly shown in Fig. 5 of the drawing. In this position the pin 56 travels over the camming surface 59 and engages the semi-circular recess 60 which is relatively closer to the axis of the axis 48 of the lever and permits the spring 53 to actuate the lock 52 to its locking position. An actuation of the lever 50 in a rearward direction moves the latch 52 to the position shown in Fig. 1 of the drawing and permits the pawl 39 to engage the next successive recess 43 of the sprocket wheel ring 27 so that the sprocket ring 27 and gearing mechanism as a whole drives as a single sprocket wheel. Mounted on one side of the plate 33 adjacent the pawl 39 carried by the internal gear ring 31, is substantially arcuate camming plate 61. This arcuate plate 61 as well as the plate 33 has a gradually extending eccentric cam surface as shown at 62 which extends substantially half way around the plate 33 with its highest raised portion at a point adjacent the pawl 39. The cam portion 62 is adapted to engage the laterally projecting flange 55 of the latch 52 to raise the latch against the tension of the spring 53 into a position to engage the top of the pawl 39. This arcuate member 61 has a radially extending slot 63 which is in alignment with a similar radially extending slot 63' in the plate 33 (see Figs. 1 and 2). Both of these slots register with the recess 38 in which the pawl 39 is mounted.

Summarizing the operation of my improved variable drive speed sprocket wheel which is adapted to be substituted for the conventional bicycle sprocket wheel, it will be understood that when the pawl 39 carried by the internal gear ring 33 engages one of the recesses 43 in the sprocket wheel ring 27 and the latch 52 as well as the lever 50 is in the position shown in Fig. 1, actuation of the pedal members 17 and 18 will revolve the inner gear 36, pinions 24 and internal gear ring 33 as well as the sprocket wheel ring 27 as one integral sprocket and afford the conventional high speed drive now embodied in the conventional bicycle. However, should the operator of the bicycle desire to reduce the speed so as to afford greater power in climbing a hill, the lever 50 is actuated forwardly about its pivot 48 on the bracket 44 permitting the spring 53 to move the latch 52 forwardly by the actuation of the camming surface 59 of the lever from the position shown in Fig. 1 to the position shown in Fig. 5 of the drawing. When it is moved to this position the laterally projecting flange 55 of the latch 52 will be raised by the eccentric or camming surfaces 62 of the arcuate member 61 and plate 33 until the aligned recesses 63 and 63' are reached, then the flange 55 of the pawl 52 will depress the pawl 39 so as to disengage it from one of the recesses 43 in the sprocket wheel ring 27. Simultaneously with the unlocking of the pawl 39 from the sprocket wheel 27, the latch flange 55 enters the recesses 63 and 63' of the member 61 and 33 to lock the internal gear ring 31 against rotation. When the internal gear ring is locked against rotation, the gear 36 will be continued to be driven by the actuation of the pedals and will revolve at a slower speed the pinions 24, which in turn, are journaled on the plate 26 carrying the sprocket wheel ring 27 therewith at a relatively lower speed. Should the operator desire to again increase the speed, the lever 50 is swung rearwardly to disengage the latch 52 from the recess 63 and 63' of the internal gear ring, thereby permitting the pawl 39 to be moved outwardly by the action of the spring 40 causing the same to engage the next successive one of the recesses 43 of the sprocket wheel ring 27 so that the high speed may then again be attained. In connection with my invention it will be observed that there is no intermediate or neutral position because the pawl 39 will engage the next adjacent recess 43 of the sprocket wheel ring by slight relative movement of these relatively movable parts so that the present variable speed drive wheel sprocket provides the element of safety not afforded by any variable speed drive sprocket heretofore used in connection with bicycles. Another important feature of the invention resides in the compactness of the variable drive speed sprocket so that it may be readily substituted for the conventional sprocket wheel now employed in bicycles. In this connection also, it will be noted that a simple lever attachment may be mounted in the frame structure of the bicycle without mutilating or destroying any of the parts thereof.

While in the above specification I have described one embodiment which my invention may assume in practice, it will of course be understood that the same is capable of modification and that modification may be made without departing from the spirit and scope of the invention as expressed in the following claims.

What I claim is my invention and desire to secure by Letters Patent is:

1. The combination with a conventional bicycle, of a variable speed drive sprocket wheel adapted to be substituted for the conventional drive sprocket wheel without modifying any of the parts of said bicycle comprising a driving gear adapted to be driven by the pedal crank thereof, pinions meshing with said gear and driven thereby, a plate arranged concentric with said gear and supporting said pinions, a sprocket wheel ring carried by said plate, an internal gear ring mounted within said sprocket wheel ring and meshing with said pinions, means for locking said internal gear ring to said sprocket wheel ring, and manually controlled means including a lever operated cam latch mounted on said bicycle and adapted to be moved into the path of said first named means for disengaging said internal gear ring from said sprocket wheel ring.

2. The combination with a bicycle, of a variable drive speed sprocket wheel therefor comprising a gear secured to the crank of said bicycle, a plate arranged concentrically with said gear and adapted to rotate with respect thereto, pinions secured to said plate and meshing with said gear, a sprocket wheel ring secured adjacent the periphery of said plate, an internal gear ring loosely mounted within said sprocket wheel ring, a spring pressed pawl carried by said internal gear ring and engageable with a recess in said sprocket wheel ring for locking both of said rings together, a control lever mounted on said bicycle, a latch member operatively connected to said lever and adapted to be moved into the path of said pawl, and camming means formed on one side of said internal gear ring and adapted to engage said latch for directing the same into engagement with said pawl.

3. The combination with a bicycle, of a variable drive speed sprocket wheel therefor comprising a gear secured to the crank of said bicycle, a plate arranged concentrically with said gear and adapted to rotate with respect thereto, pinions secured to said plate and meshing with said gear, a sprocket wheel ring secured adjacent the periphery of said plate, an internal gear ring loosely mounted within said sprocket wheel ring, a spring pressed pawl carried by said internal gear ring and engageable with a recess in said sprocket wheel ring for locking both of said rings together, a control mechanism comprising a bracket adapted to be clamped to said bicycle adjacent said variable drive sprocket wheel, a camming plate pivoted to said bracket, a lever for operating said camming plate, and a spring actuated latch mounted on said bracket and adapted to be actuated by said camming plate, said latch adapted to be moved into and out of engagement with said pawl for controlling the variable speed drive of said sprocket wheel.

GUSTAV C. MONCKMEIER.